United States Patent [19]
Ochiai

[11] 3,981,181
[45] Sept. 21, 1976

[54] METHOD FOR DETECTING LIQUID LEAK AND A CABLE THEREFOR

[76] Inventor: Sadamasa Ochiai, 1089-8 Shimofujisawa, Iruma, Saitama, Japan

[22] Filed: July 10, 1975

[21] Appl. No.: 594,615

[30] Foreign Application Priority Data
July 13, 1974  Japan................. 49-79736

[52] U.S. Cl. ................. 73/40.5 R; 324/52
[51] Int. Cl.² ......................... G01M 3/16
[58] Field of Search.............. 73/40.5; 324/52; 340/235, 242

[56] References Cited
UNITED STATES PATENTS
3,600,674  8/1971  Roberts................. 73/40.5
3,909,712  9/1975  Rietz..................... 324/52

*Primary Examiner*—S. Clement Swisher
*Attorney, Agent, or Firm*—E. A. Uebler

[57] ABSTRACT

In the method for detecting liquid leak of the present invention, the inventive cable, i.e., a parallel pair or a coaxial cable insulated with porous polymer material, is placed along or under a storage and/or transport means for conveying chemicals. If leakage occurs, the leaked liquid permeates into fine pores in the porous insulation material separating two conductors from each other, and varies the characteristic impedance of the cable to some detectable extent. The variation of impedance is electrically measured by a pulse reflection method (TDR). The inventive method comprises; sending pulse waves from one end of the cable, sensing the reflected and deformed pulse shape, and thus detecting and locating the liquid leak.

7 Claims, 6 Drawing Figures

FIG. 1
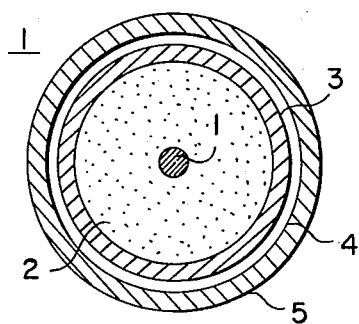
FIG. 2
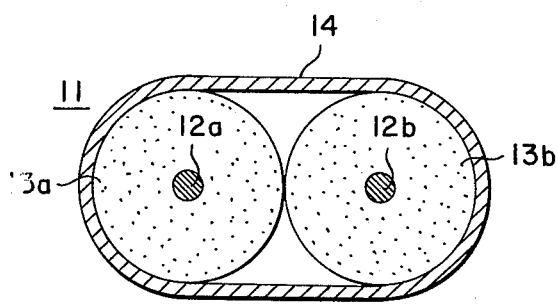
FIG. 3
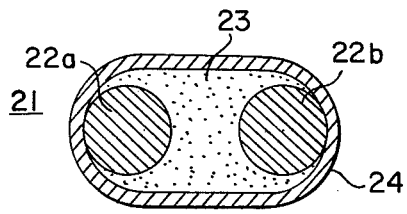
FIG. 4A
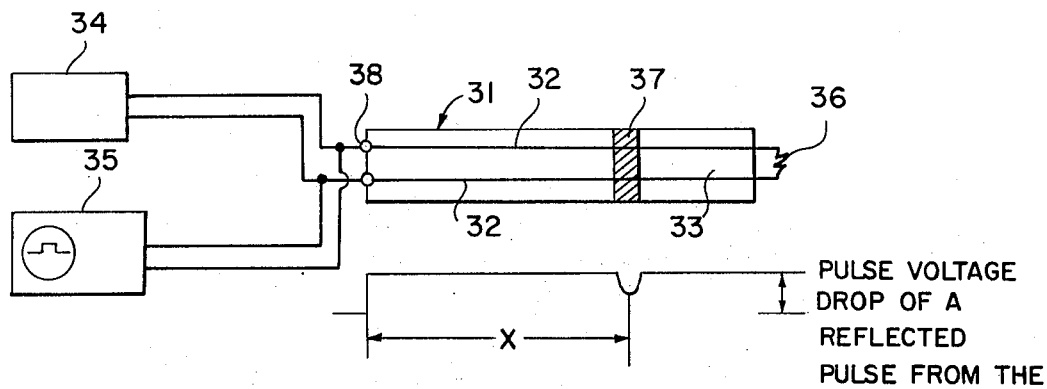
FIG. 4B

METHOD FOR DETECTING LIQUID LEAK AND A CABLE THEREFOR

BACKGROUND OF THE INVENTION

1. Field of the Invention

The present invention relates to a method for detecting liquid leaks from a variety of systems such as chemical plants, tanks, pipelines for reserving and conveying liquids, and also relates to a cable therefor.

2. Description of the Prior Art

Many kinds of liquid chemicals are stored in tanks and transported between plants through pipelines. This has widely been done in industries. The liquid transportation through pipeline has been preferentially used because of its higher efficiency and lower expense compared with that of the conventional method of liquid transport, tank lorry and tank wagon. However, a number of leaks and leak-related accidents have taken place in the storage and/or transportation systems. The numbers of petroleum pipeline accidents in the United States during the period 1968–1970 are, for example: outer surface corrosion (517, 42%), mishap (258, 21%), inferior pipe seam (92, 7.4%), inner surface corrosion (63, 5.0%), mis-operation (40, 3.2%), gasket breakage (35, 2.8%), valve trouble (25, 2.0%), old scar (25, 2.0%), over surge pressure (18, 1.5%), mis-welding (17, 1.4%), others (bad sealing, flood, land slide, mis-coupling, etc.; 144, 11.7%); 411 accidents per year on the average.

In addition, the liquid chemicals leaked constitutes not only danger of explosion, but also environmental pollution, so that the leak detection is very important from both the standpoint of security and environmental preservation. In Japan, in constructing petroleum pipelines, it is necessary by law, ministerial ordinance and notification to install security and watch systems, such as automatic operation control, emergency alarm, pump stopper, etc. However, a leak detecting method having enough sensitivity and reliability has not yet been established.

Explanation will be made here on the conventional leak detecting systems:

1. Pressure Measuring Method during Operation

This method is commonly used in countries outside of Japan, and corresponds to the method defined in Japanese Ministerial Ordinance, Article 29, and Notification Article 41. The method comprises placing pressure gauges at an appropriate interval along a pipeline, measuring pressures at each gauge, comparing the measured pressures with the pressure gradient previously calculated and thus detecting pressure drop due to liquid leak. This is suitable for detecting a sudden and large amount of liquid leak, but unsuitable for detecting a small leak, and has problems in pressure alteration due to the change of liquid type and pipeline temperature.

2. Pressure Difference Method on Stop of Operation

In this method, all block valves in a pipeline are closed at one time, and the pressure difference between both sides of each valve is measured. When a leak occurs in a given section between two valves, pressure differences are produced in both valves. In this method, however, a pressure difference is also generated by a slight temperature difference between adjacent sections (e.g., a temperature drop of 0.1°C results in a pressure drop of 1 kg/cm$^2$), so that it is necessary for this system to pre-anticipate pressure alteration due to geological and meterological variations. Thus the accuracy of this method is impaired. Furthermore, the slow rate of leak detection of this method (e.g.; 3 days for detecting 10 l/hr leak) occupies about 10% of total time of pipeline operation (90% working ratio). This method is specified in the Japanese Ministerial Ordinance, Article 32 and Notification, Article 43, Paragraph 3, and in West Germany this method is compelled by law to be employed in the beverage industries.

3. Static Pressure Difference Method

This is similar in principle to the above method 2 except that a pressure drop is measured between two valves. This method can detect a large leak (more than 500 l/hr) within 15 minutes total test time, but cannot detect a small leak.

4. Flow Amount Measuring Method

This method detects a leak by measuring flow amounts by flowmeters placed at inlet and outlet ports, and then comparing the amounts. For this purpose, two kinds of flowmeters, a flash type for flow control and an integrating flowmeter for measuring a transport amount, are needed. The Ordinance, Article 27, and Notification, Article 41 state that alarm shall be made when the flow amount difference exceeds 80 l per 30 sec. This method, however, has the following defects: (a) Since the pipe expansion and contraction due to pressure change with the flow starting and stopping cannot be neglected, the flow measurements could include errors, if the pressure changes have previously been estimated: (b) When transporting different types of oil through a pipeline, the liquid flow is rapidly altered with the valve opening/shutting and pump operation on changing the liquid: (c) Turbine type flowmeters are generally employed in this method, but they produce errors owing to wear with time, hence require periodical inspection.

5. Ultrasonic Method

This method detects a pipeline leak by sensing ultrasonic waves generated by the pressure difference at a leak point. This sensing is performed by an apparatus which flows inside the tube and is equipped with an ultrasonic receiver, amplifier, amplitude recorder, range meter, and battery. There are two types of ultrasonic detectors based on this principle; i.e., Royal Dutch Shell Type and Esso Research and Engineering Co., Type. The Esso Type detector is actually used in the crude oil pipeline (pipe dia. 40 inches) from Trieste, Italy to Ingor Stadt, Germany. This method has a limit in leak detecting ability (i.e., the maximum sensitivity being 0.1 to 0.4% of the total flow), is unsuitable for a pipeline with a small diameter, and is expensive.

6. Gas Sensor Method

The arrangement of this method, stated in Japanese patent publication Sho 48-11134, comprises an oil resistant fibrous layer having oil and air permeability wound around a pipeline, a small diameter tube having pores contained in the fibrous layer and connected to a valve box located in the pipeline, and a gas sensor placed in the valve box. A leak is detected by sensing a leaked gas led to the sensor through the small tube. A compressor connected to the tube enables faster leak detection. This method also requires increased expenses in installation and construction, and the sensitivity thereof is not so sharp.

In addition to the prior processes mentioned above, the utilization of a cable has already been proposed for liquid leak detection. The cable is a pair of insulated conductors, which insulation material is dissolved by a leaked liquid, so that the two conductors are shortcircuited to indicate the leak. An example thereof is a polystyrene-insulated cable for detecting gasoline leak. This type of cable, however, has a danger for ignition of leaked liquid due to a spark generated by shortcircuiting, so that it is quite unsuitable for a pipeline conveying flammable liquids.

SUMMARY OF THE INVENTION

From the viewpoint of overcoming the defects of above mentioned prior methods, the applicant has investigated different kinds of methods for detecting liquid leaks, and noted the fact that, if a cable, which is remarkably changed in its characteristics such as capacity, characteristic impedance, dielectric constant, or dielectric loss tangent, when wetted with a leaked liquid, is obtained, the alterations of such characteristics can readily be measured by electrical methods, e.g., pulse reflection method (e.g., pulse radar method, time domain reflectometer, "TDR" method), Murraryloop method, or insulation resistance method, and the leak can be detected. The present invention is based upon the above idea.

The cable of the present invention comprises two electrical conductors spaced in parallel relationship and a porous insulation material separating said conductors from each other, the insulation material being made of a porous crystalline polymer and having a micro-structure consisting of numerous fine nodes interconnected by fibrils and numerous continuous voids formed between nodes and fibrils.

The inventive method for detecting a liquid leak comprises laying the above cable along or under storage and/or transport means for liquids, sending pulses into the cable from one end, sensing the pulse shape reflected and deformed by the impregnation of liquid into the cable, and thus detecting and locating the liquid leak from said means.

BRIEF DESCRIPTION OF THE DRAWINGS

FIG. 1 to FIG. 3 are cross sections of the leak detecting cables embodied in the present invention.

FIG. 4 - A is a schematic view of an apparatus embodying the inventive method for measuring the characteristic impedance change of the inventive leak detecting cable.

FIG. 4 - B is display of the reflected pulse shape on an oscilloscope at the time of impedance measurement.

DETAILED DESCRIPTION OF THE INVENTION

Figure 5:
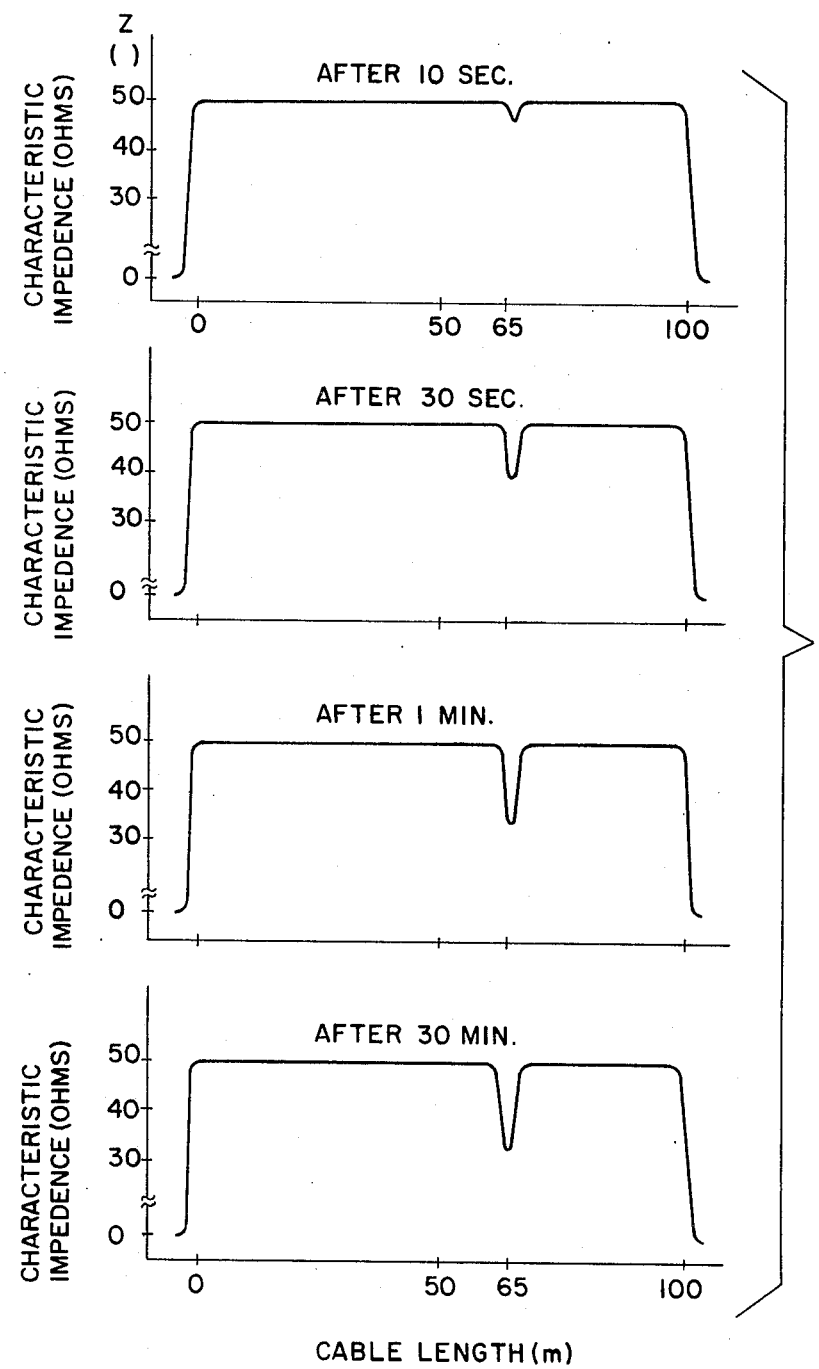
FIG. 5 shows the cable characteristic impedance changes as a function of time when the cable is impregnated with methylethylketone.

The cable of the present invention may be either a pair of electrical conductors or a coaxial type. The coaxial type cable consists of an inner conductor insulated with said porous insulating material in a given thickness, an outer conductor of served or braided wires around the inner conductor, and, if necessary, a porous outer covering and/or protective jacket outside the outer conductor. The pair cable is made of two conductors insulated with said insulation material (one of which can be a bare conductor) which are held together by fusion bonding, adhering, or tape wrapping with a tape having liquid absorbance, and an appropriate jacket surrounding the pair.

Further explanation will be made on the cable mentioned above using the attached drawings.

In the coaxial cable 1 of FIG. 1, an inner conductor 1 is covered with a porous insulation material 2, surrounded coaxially by an outer conductor 3. The outer conductor 3 is wrapped with an outer covering 4 and further with a jacket 5. The outer covering 4 and jacket 5 may be omitted in certain circumstances.

In the pair cable 11 shown in FIG. 2, each of two conductors 12a and 12b is covered with a porous insulation material 13a and 13b, and they are held together with a liquid permeable tape 14.

The pair cable 21 shown in FIG. 3 has two conductors 22a and 22b, which are separated by a porous insulator 23. The conductors 22a and 22b, and the insulator 23 are assembled together by a liquid permeable tape 24 which may be the same material as the insulator 23.

Conductors employed in the inventive cable may be any metal having electric conductivity. Examples thereof include copper, aluminum wire, and those with plating, and the like. A conductor with thin insulation such as polyimide enamel can also be used for the cable.

The porous insulation material used for covering the said conductors is obtained from crystalline polymer, and has a porous micro-structure consisting of numerous fine nodes interconnected by micro fibrils and numerous fine pores formed continuously between the nodes and fibrils. These crystalline polymers include polytetrafluoroethylene (PTFE), PTFE containing small amount of copolymer of polytetrafluoroethylene and hexafluoropropylene (FEP), polyethylene, polypropylene, etc.

Said insulation material with a porous microstructure can generally be produced by preparing a preform of said crystalline polymer, stretching the preform at a temperature below the melt point of said polymer, and then heating the stretched mass to a temperature about the melting point of the polymer to heat-set the inner stress produced by stretching. The porous insulation material should preferably have a porosity more than 40% (inclusive). The pores should be continuous with each other, and constitute so called continuous fine pores.

An explanation will be made below on the porous insulation material used for the present invention, taking the PTFE processing as an example. Of course, the insulation material need not be limited to PTFE.

First, a mixture of PTFE fine powder with liquid lubricant (ca. 20% by weight of PTFE) is paste-extruded and/or calendered to form a preform (e.g., sheet, etc.), then the preform is stretched in at least one direction at a temperature below the melt point of PTFE. According to this process, there is formed a continuously porous fibrillated structure where numerous fine nodes are interconnected by fine fibrils, and numerous voids are formed among them. The pore size thereof ranges from 0.1 to 100 microns with the porosity from 10 to 90% and a specific gravity below 1.4. The porous structure of the material has a selective permeability to gases and liquids. This permeability allows absorption of the leaked liquids, thus altering the electrical characteristics of the insulation material, and accomplishes the object of the present invention.

The liquids detected by the method of the present invention can be any liquids capable of penetrating into the fine pores of the porous material. They include, for example, hydrocarbons such as gasoline, heavy oil, kerosene, crude oil, etc.; alcohols, ketones, ethers, esters, acids, bases; and mixtures, emulsions, dispersions thereof. In some particular cases, the inventive method can detect a specified component(s) in the mixtures, emulsions, or dispersions. The process is also able to detect leaks such that one leaked liquid is mixing in another, e.g. mixing in of oil into water. The last situation, where the inventive process makes the greatest contribution to pipeline maintenance, is considered to be realized at the time of oil leak from a pipeline into the wet environment. In detecting a liquid which has poorer permeability to the cable insulation, the permeation of the liquid is facilitated by impregnating the porous insulation previously with a substance having affinity to the liquid to be detected. For example, in the cable for use with a crude oil pipeline, the insulation can be impregnated with a crude or heavy oil solution (conc. 10–30%), then the solvent may be evaporated.

The method of the present invention utilizes the characteristic impedance alternation of the cable due to the impregnation of the liquid to be detected into the porous insulation. The alteration is measured by transmitting a pulse wave from one end into the cable, then analyzing the deformed wave reflected from the point where the characteristic impedance has been altered by the impregnation of liquid (i.e., measurement of voltage standing wave ratio, VSWR).

The method of the present invention will be further explained using FIGS. 4 - A and B.

In FIG. 4 - A, the leak detection cable 31 consists of two parallel conductors 32 and 33, one end of which being connected to a pulse generator 34 and a receiver (oscilloscope) 35 connected in parallel to the generator, and the other end being terminated by a resistor 36.

Upon sending a pulse wave with a period T [sec.] and pulse width τ[sec] into the cable, the pulse propagates at a speed peculiar to the wave (generally, 50–80% of the light speed). A reflected pulse wave is shown on a receiver screen 35 as a trapezoid while there is no impregnation of liquid into an insulation 33 of the cable 31. If an impregnation occurs at a point 37 in the cable 31, the characteristic impedance of the cable is changed, and some pulse is reflected back to the receiver 35. The reflected pulse wave, when amplified and projected on a Braun tube as a function of time synchronized with the input pulse period T, exhibits a pulse wave as shown in FIG. 4 - B.

The distance between the end 38 and the impregnated point 37 is calculated from the following equation:

$$x = vt/2 \text{ (m)}$$

in which V is the pulse propagation speed (m/sec), and t is the time required for the pulse to move back and forth between the end 38 and the point 37.

The impregnated point 37 is exhibited on the Braun tube as a V-shape as shown in FIG. 4 - B. The depth of the V-shape indicates the extent of the leak.

The present invention will be illustrated more clearly by the following examples.

EXAMPLE 1.

A coaxial cable similar to that of FIG. 1 was produced in compliance with the following specifications:
Inner conductor: silver plated copper wire strand, diameter 2.4 mm
Insulation material: porous PTFE, dielectric constant 1.3, porosity ca. 50%, thickness 1.6 mm
Outer conductor: silver plated copper wire braid
Characteristic impedance: 50 Ω

Characteristic impedance variation of the above cable on impregnation of liquids was measured by an improved pulse reflection method, i.e., Time Domain Reflectometry (TDR). The cable used for the measurement was 100m long. The liquids shown in the extreme left column of Table 1, were used to impregnate the cable at a given point by dropping the liquids on the cable. The dropping of liquid was run for 30 minutes. Later the impregnation was done by dipping the cable in the liquids. The cable was taken out of the liquid and held in the air at the time of measurement. When the impregnant was viscous, the liquid was wiped off from the cable surface by cloth to avoid liquid dropping. The results are shown in Table 1, and the characteristic impedance change on impregnation of methylethylketone is diagramed in FIG. 5 as a function of time.

Table 1

| | Characteristic Impedance Alteration with Time (Unit, ohm) | | | | | |
|---|---|---|---|---|---|---|
| | 10 sec | 30 sec | 1 min. | 30 min. | 6 hrs. | 24 hrs. |
| methylethyl-ketone | 47 | 39 | 34 | 33 | 33 | 33 |
| gasoline | 46 | 44 | 43 | 42 | 42 | 42 |
| heating oil | 49 | 47 | 46 | 45 | 45 | 45 |
| heavy oil A | 50 | 49 | 48 | 43 | 40 | 40 |
| heavy oil C | 50 | 50 | 50 | 50 | 50 | 50 |
| crude oil (Indonesia) | 50 | 50 | 50 | 50 | 50 | 48 |

According to the experiments, liquid leak was readily detected and located by pulse reflectometry when the cable characteristic impedance was changed by 4% from the initial value.

EXAMPLE 2.

Example 1 was repeated except that the porous PTFE insulation of the coaxial cable of Example 1 contained a crude oil component. The component was incorporated into the insulation by impregnating a 15% by weight crude oil solution in gasoline, and then evaporating the solvent. Alteration of the cable characteristics on liquid impregnation is shown in Table 2.

Table 2

| | Characteristic Impedance (ohm) | | | | | |
|---|---|---|---|---|---|---|
| | 10 sec | 30 sec | 1 min. | 30 min. | 6 hrs. | 24 hrs. |
| crude oil (at room temperature) | 50 | 50 | 49 | 46 | 44 | 44 |
| crude oil (at 70°C) | 50 | 50 | 48 | 45 | 43 | 43 |

EXAMPLE 3.

A parallel pair cable as shown in FIG. 2 was made from two insulated wires held together; each wire being a 2.4 mm diameter silver plated copper conductor with a porous PTFE insulation 1.6 mm in thickness. The characteristic impedance of the cable was 150.

What is claimed is:

1. A method for detecting liquid leaks from holding means for said liquid, which method comprises,
   a. laying a cable adjacent said holding means, which cable comprises two electrical conductors held in substantially parallel relationship and insulated from each other by a porous insulating material having continuous pores;
   b. sending an electrical pulse wave into one end of said cable, and
   c. sensing the pulse shape reflected in said cable, said pulse shape being distorted by liquid leaks in said holding means which leaks alter the characteristic impedance of said cable, thereby enabling the detection and location of said leaks.
2. The method of claim 1 in which said holding means are storage vessels.
3. The method of claim 1 in which said holding means are transport pipelines.
4. The method of claim 1 in which said electrical conductors are a pair of wires.
5. The method of claim 1 in which said cable is a coaxial cable, said conductors being (a) the center wire and (b) the shielding of said coaxial cable.
6. The method of claim 1 in which said insulation material is expanded porous polytetrafluoroethylene.
7. The method of claim 1 in which the porosity of said insulating material exceeds 40%.

* * * * *